(12) United States Patent
Steiner

(10) Patent No.: US 12,740,661 B2
(45) Date of Patent: Sep. 22, 2026

(54) APPARATUS FOR PRODUCING A BEVERAGE, IN PARTICULAR COFFEE

(71) Applicant: Starbucks Corporation, Seattle, WA (US)

(72) Inventor: Adrian Steiner, Weggis (CH)

(73) Assignee: Starbucks Corporation, Seattle, WA (US)

( * ) Notice: Subject to any disclaimer, the term of this patent is extended or adjusted under 35 U.S.C. 154(b) by 893 days.

(21) Appl. No.: 18/159,145

(22) Filed: Jan. 25, 2023

(65) Prior Publication Data

US 2023/0233015 A1 Jul. 27, 2023

(30) Foreign Application Priority Data

Jan. 26, 2022 (CH) .......................... CH000080/2022

(51) Int. Cl.

| | |
|---|---|
| ***A47J 31/36*** | (2006.01) |
| ***A47J 31/00*** | (2006.01) |
| ***A47J 31/40*** | (2006.01) |
| ***A47J 31/42*** | (2006.01) |
| ***A47J 31/60*** | (2006.01) |

(52) U.S. Cl.

CPC ......... *A47J 31/3619* (2013.01); *A47J 31/007* (2013.01); *A47J 31/3614* (2013.01); *A47J 31/405* (2013.01); *A47J 31/42* (2013.01); *A47J 31/60* (2013.01); *A47J 31/3609* (2013.01)

(58) Field of Classification Search

CPC ...... A47J 31/007; A47J 31/24; A47J 31/3604; A47J 31/3609; A47J 31/3614; A47J 31/3619; A47J 31/405

See application file for complete search history.

(56) References Cited

U.S. PATENT DOCUMENTS

| | | | | |
|---|---|---|---|---|
| 2,910,928 A * | 11/1959 | Rota | .................. | A47J 31/3619 99/302 R |
| 5,316,781 A * | 5/1994 | Lussi | .................. | A47J 31/3619 426/433 |
| 5,333,537 A * | 8/1994 | Lussi | .................. | A47J 31/3619 99/287 |

(Continued)

FOREIGN PATENT DOCUMENTS

| | | | | |
|---|---|---|---|---|
| CH | 559028 A5 * | 2/1975 | .......... | A47J 31/3614 |
| CH | 674703 A5 * | 7/1990 | .......... | A47J 31/3614 |

(Continued)

*Primary Examiner* — Alain Chau

(74) *Attorney, Agent, or Firm* — Knobbe, Martens, Olson & Bear, LLP

(57) ABSTRACT

Apparatus for producing a beverage, in particular coffee, includes brewing cylinders adjusted in the manner of a carousel about an axis of rotation, each with an extraction cell and an extraction piston, and beneath the brewing cylinder at least two pistons. The pistons are positioned to be pushed into a brewing cylinder or extracted from it. Provided above the brewing cylinders are at least two feed channels and, arranged at a distance therefrom, at least two extraction pistons. These feed channels can each be connected, in a specific position of the brewing cylinders, at least above a brewing cylinder for loading of beverage powder, into which a piston can in each case be inserted from below. The extraction pistons are each insertable into a brewing cylinder adjacent to the loaded brewing cylinder or removable from it.

20 Claims, 3 Drawing Sheets

(56) References Cited

U.S. PATENT DOCUMENTS

| | | | | |
|---|---|---|---|---|
| 5,622,099 | A * | 4/1997 | Frei | A47J 31/4403<br>99/289 P |
| 6,745,668 | B2 * | 6/2004 | Levi | A47J 31/3614<br>99/289 P |
| 8,925,441 | B2 | 1/2015 | Steiner | |
| 9,259,115 | B2 * | 2/2016 | Radhakrishnan | A23F 5/24 |
| 10,898,025 | B2 | 1/2021 | Steiner | |
| 2003/0000393 | A1 * | 1/2003 | Levi | A47J 31/3614<br>99/279 |
| 2016/0249762 | A1 * | 9/2016 | Lüssi | A47J 31/3619<br>99/289 R |
| 2020/0008608 | A1 * | 1/2020 | Huang | A47J 31/3614 |
| 2022/0287496 | A1 | 9/2022 | Steiner | |
| 2022/0369850 | A1 | 11/2022 | Steiner | |
| 2023/0028384 | A1 * | 1/2023 | Levi | A47J 31/52 |
| 2024/0298664 | A1 * | 9/2024 | Buchholz | A23F 5/262 |

FOREIGN PATENT DOCUMENTS

| | | | | |
|---|---|---|---|---|
| DE | 202005020774 | U1 | 8/2006 | |
| EP | 0528759 | A1 * | 2/1993 | A47J 31/3609 |
| WO | WO-2007022860 | A1 * | 3/2007 | A47J 31/3614 |
| WO | WO 2021/115792 | A1 | 6/2021 | |

* cited by examiner 16
11
37
24'
24a
34a
31
24"
21
24b
34b
25
27
27
40

APPARATUS FOR PRODUCING A BEVERAGE, IN PARTICULAR COFFEE

FIELD OF THE INVENTION

The invention relates to an apparatus for producing a beverage, in particular coffee, which comprises a plurality of brewing cylinders in the form of a carousel, which can be adjusted about an axis of rotation, each with an extraction cell, above this at least one feed channel for the beverage powder, an extraction piston, and a pivot unit which can be adjusted beneath the brewing cylinder with at least two pistons, wherein the said pistons are positioned in relation to one another in such a way that they can each be drawn into and out of a brewing cylinder.

BACKGROUND OF THE INVENTION

With a known coffee machine in accordance with the printed specification DE 20 2005 020 774 U, provision is made for a revolver mechanism with a plurality of brewing chambers, a loading station, a brewing station, and an emptying station, which in this situation are arranged one after another on the revolver mechanism in such a way that, as a result of a rotation of the revolver mechanism, in each case, the brewing chambers are pivoted one after another, step by step, from the loading station to the brewing station and on to the emptying station. As a result, coffee powder can be filled into one brewing chamber, and, at the same time, can be brewed in the brewing chamber offset by 90° into which powder has been filled beforehand, and the coffee beverage produced can be discharged downwards. This allows for an increased quantity production of coffee beverages. The loading station, the brewing station, and the emptying station are configured in principle as separate units, which occupy a considerable amount of space, and wherein the seals on the brewing chamber carriers cannot always be guaranteed to be long lasting.

OBJECTS AND SUMMARY OF THE INVENTION

Taking this known coffee machine as a basis, the object of the invention is to develop further an apparatus and a coffee machine of the generic type referred to in such a way that an automated production of coffee with an increased quantity capacity is achieved by means of a compact and simple structural design of the apparatus.

This object is solved according to the invention by an apparatus in which there are at least two feed channels above brewing cylinders, and arranged at a distance from these are at least two extraction pistons. In a specific position of the brewing cylinders, the feed channels are in each case connected at least above one brewing cylinder for the loading of the beverage powder, into which one piston each is inserted from below, while the extraction pistons are arranged such that they are each inserted into or extracted from a brewing cylinder adjacent to the brewing cylinder which is loaded.

According to the invention, with this apparatus, provision is made for at least two feed channels above the carousel-type rotatable brewing cylinders, and for two extraction pistons arranged at a distance from these, wherein, in a specific position of the brewing cylinders, the feed channels can in each case be connected at least above one of the brewing cylinders for the loading of the beverage powder, into each of which a piston can be introduced from beneath, while the extraction pistons are each arranged such that they can be inserted into or extracted from a brewing cylinder, next to the brewing cylinder which can be loaded With this configuration of the apparatus according to the invention, it is possible, very efficiently, with each carousel-type rotation of the brewing cylinders, for at least two brewing cylinders to be filled with beverage powder, and simultaneously for at least two portions of coffee to be produced and discharged. As a result, in a cyclic manner, beverages can be filled via two outlets, ready to drink, into one or preferably more containers, such as cups, wherein only short interruptions of the beverage outlet occur at the change of the loaded brewing cylinders into the extraction positions, rotated through 60°, and when the pistons are moved backwards.

Very advantageously, the brewing cylinders, arranged axis-parallel to one another, are held in a circular arrangement on a carousel about the axis of rotation, and can be moved in a vertical guide against the feed channels and towards and away from the extraction pistons.

Preferably, six brewing cylinders are held on the carrier element of the carousel, at a distance interval of 60° to one another, wherein the two feed channels and the two extraction pistons, when in a specific position, each interact with a brewing cylinder, which in turn are arranged opposite one another offset by 180°.

Advantageously, a pivot unit positioned beneath the brewing cylinders, with the at least two pistons, can be moved on and off the vertical guide, as can the carousel, wherein the height of this pivot unit can be adjusted by a drive element, and can also be rotated by means of an additional drive unit.

Advantageously, in this situation, provision is made, as the drive element of the pivot unit, for a vertical drive spindle in the centre of the apparatus, which is rotationally connected to the pivot unit and which preferably extends from a lower base plate, through the pivot unit and the carrier element, as far as a rotary drive unit.

As a further advantage, the carousel with the brewing cylinders can be lowered by the pivot unit, which is operationally connected to it, by means of the pistons, and can be rotated and raised into the respective next position. As a result, it is possible for all the movements of the apparatus to be carried out with only two drive units.

When loading the beverage powder, both the pistons of the pivot unit are each pushed into one of the brewing cylinders, wherein they remain in these brewing cylinders in the inserted state, then are pivoted into the next position when the pivot unit and, with it, the brewing cylinders are lowered, and the brewing cylinders, closed on the under side by the pistons, are in each case pushed into the extraction pistons. This common lowering, pivoting, and raising, which take place solely by the action of the pivot unit, likewise allows for a very simple controlling of the apparatus.

After the extraction, a movement outwards and pivoting away of the pistons of the pivot unit out of the respective brewing cylinder takes place by the locking of the carousel, and with it the brewing cylinders, at a specific height. This likewise contributes to the simple structural design of the apparatus.

BRIEF DESCRIPTION OF THE DRAWINGS

The invention and its further advantages are explained in greater detail hereinafter on the basis of exemplary embodiments and by reference to the drawings. The Figures show:

FIG. 5 is a longitudinal section of the apparatus according to FIG. 1, with the brewing cylinder on the right with beverage powder, the inserted extraction piston at the top, and the lower piston in it, in the extraction position.

DETAILED DESCRIPTION OF THE INVENTION

Figure 1:
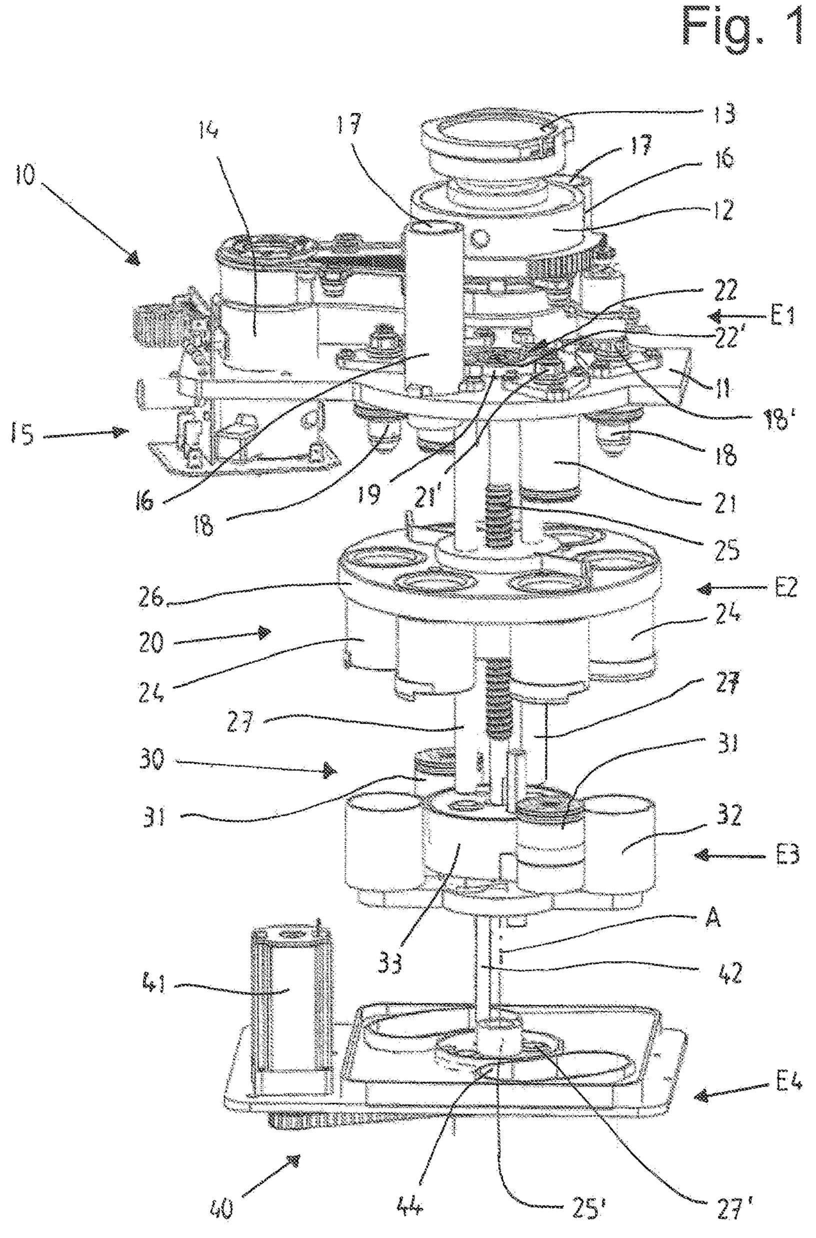
FIG. 1 is a perspective exploded view of an apparatus according to the invention.
Figures 2, 3, 4:
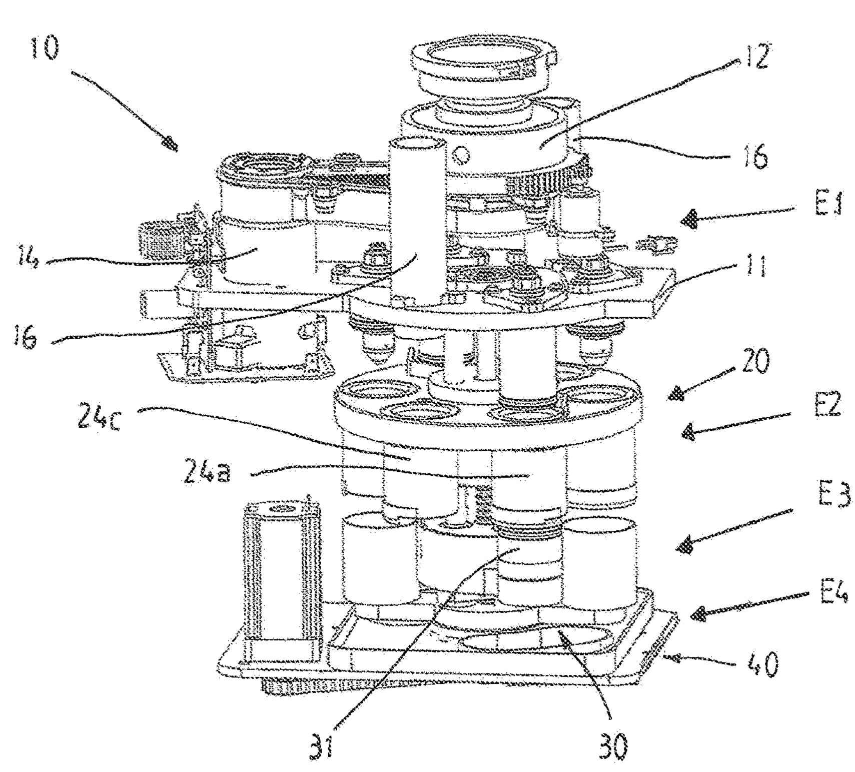
FIG. 2 is a perspective view of the apparatus according to FIG. 1, in the extended position.
FIG. 3 is a longitudinal section of the apparatus according to FIG. 1, with the one brewing cylinder on the left at the loading of the beverage powder, and the other on the right at the ejection of a beverage cake.
FIG. 4 is a longitudinal section of the apparatus according to FIG. 1, with the brewing cylinder with the beverage powder lowered, and the lower piston in it, which are then rotated to the right together, into the next position.

FIG. 1 and FIG. 2 show an apparatus 10 for producing a beverage, in particular coffee, which can be conveyed through an outlet into a container, such as a jug or a cup. It is advantageously suitable for the brewing and production of hot coffee. It is also possible, however, for cold coffee to be produced, wherein brewing would not take place in the brewing cylinders, which are in general designated by the reference number 24, but only extraction.

Such an apparatus 10 can be configured as a coffee machine, which would be provided with a conventional housing structure and could comprise at least one operating surface with a display, a bean container, a water feed and outlet, a milk container, a milk froth producer, outlets, and further component parts, which are not represented in any greater detail. This apparatus 10 can, however, likewise be configured as at least one separate module.

Instead of coffee, it is also possible with this apparatus 10 for other beverages, such as milk beverages, to be produced, wherein, instead of coffee powder, a mixture or another powder would be delivered from one or more separate containers, such as, for example, chocolate powder or the like.

With this apparatus 10 according to the invention, a structure is provided which is subdivided into four planes E1 to E4, arranged independently of one another. Positioned in the topmost plane E1 of the structure is a preferably modular unit 15, which is arranged as stationary. Assigned to this unit 15 are a base plate 11, located on this a grinding device 12 with a drive 14, connecting pieces 17 leading away from this, two feed channels 16, a rotary drive unit 22 for a drive element, and two each extraction pistons 21 and flushing pistons 18, extending downwards. By means of the connecting pieces 17 and the two feed channels 16, the beverage powder is conveyed in portions into the brewing cylinders 24.

This rotary drive unit 22 comprises a take-off wheel 22', which can be rotated by means of a toothed belt 19 and which is coupled to the vertical drive spindle 25, as a drive element, mounted on the upper side of the base plate 11. The toothed belt 19 is rotationally connected to the drive wheel of a motor, not shown in greater detail. In addition, slide guides 27 are arranged next to the drive spindle 25 and parallel to it, which are secured on the upper side of the base plate 11.

Arranged on the second plane E2 of the structure, beneath the plane E1, is a carousel 20, with six brewing cylinders 24 arranged axis-parallel to one another in circular fashion and which can be rotated about an axis of rotation A, a carrier element 26 holding these, and a vertical slide guide 27. This carousel 20 can be moved inside the brewing cylinders along this slide guide 27 from a lower position, such as can be seen in FIG. 2, into an upper position, as far as against the feed channels 16 beneath the base plate 11, towards and away from these. The six brewing cylinders 24 are held each at a distance interval of 60° from one another on the carrier element 26, which is disk shaped or of another shape. The two feed channels 16 and the two extraction pistons 21 are arranged in the base plate 11 in such a way that they interact with two brewing cylinders 24, which are located opposite one another and offset by 180°.

Arranged in the third plane E3, beneath the carousel 20, is a pivot unit 30, which is likewise height-adjustable in this slide guide 27, with two pivoting pistons 31 and two shells 32 placed next to these. In this situation, this pivot unit 30 is rotationally connected to the drive spindle 25, and is moved upwards or downwards when the spindle rotates. The two pistons 31 are mounted such that they can be pivoted about the axis of rotation A by means of a bearing ring 33, which engages with the pivot unit 30, and in this situation is positioned in such a way that in each case they can be pushed into or out of a specific brewing cylinder 24. In addition, the pistons 31 are each provided with a central hole 31' for the outlet of the beverage which has been produced, out of the extraction cell formed in the brewing cylinder 24.

Arranged in the fourth plane E4 of the structure, beneath the pivot unit 30, is a stationary catchment shell 40, with a shelf, not shown in greater detail, for collecting the beverage cake, such as coffee grounds. This catchment shell 40, like the modular unit 15, is positioned stationary in a housing or the like, but such that it can be removed. Provided to the side of this is a drive motor 41, which is operationally connected to the bearing ring 33 by means of a transmission unit, not shown in greater detail, with a drive axle 42, which allows for the controlled pivoting of the pistons 31. In addition, the drive spindle 25 and the slide guides 27, which extend from the base plate 11, through the carousel 20 and the pivot unit 30, as far as the catchment shell 40, are mounted on the under side in bearing elements 25', 27' in this catchment shell 40.

According to the invention, in a specific position of the brewing cylinders 24, the two feed channels 16 are arranged such that they can each be connected above a brewing cylinder 24 for the loading of the beverage powder, and in each case a piston 31 can be inserted into these brewing cylinders 24, while the extraction pistons 21 can be moved into and out of a brewing cylinder 24 next to the loadable brewing cylinder 24.

With this arrangement, it is possible for a predetermined quantity of beverage powder to be filled into two brewing cylinders 24, and simultaneously for the beverage to be extracted in the next two brewing cylinders 24'. As a result, it is possible with this compacted apparatus 10, in an efficient manner, for a beverage to be filled practically constantly and ready to drink through two outlets into one or preferably more containers, such as cups, wherein, at full capacity, only brief interruptions occur in the beverage outlet at the changing of the loaded brewing cylinders 24 into the extraction position, rotated through 60°, and, respectively, at the pivoting back of the pistons 31 from the respective extraction cylinder into the loading position.

During the loading with beverage powder, the feed channels 16 are each positioned above a brewing cylinder 24, 24', and the pistons 31 are inserted from below with a tight seal effect, while the extraction pistons 21 are each arranged next to a loadable brewing cylinder 24, such as to be inserted into a brewing cylinder 24' and removed again. Assigned to each of these extraction pistons 21 is a valve-controlled connection 21' for discharging the beverage from the extraction cells in the loaded brewing cylinder 24', while at each of the pistons 31 a valve-controlled water connection 36 is formed for providing water for extracting the beverage.

The two extraction pistons 21 and flushing pistons 18 extend downwards from the base plate 11 holding them, such that the brewing cylinders 24, 24' can be inserted into them. The flushing pistons 18 for the cleaning of a respective extraction cell are arranged next to a brewing cylinder 24' in the extraction position. A respective brewing cylinder 24 can be located with a tight seal above a flushing piston 18, and removed from it again. The feed channels 16, the extraction pistons 21, and the flushing pistons 18 in the base plate 11 are therefore arranged alternately offset to one another by 60° about the axis of rotation A in the unit 15, interacting with the brewing cylinders. They form a circular shape, which is dimensioned the same as that of the brewing cylinders.

Figure 5:
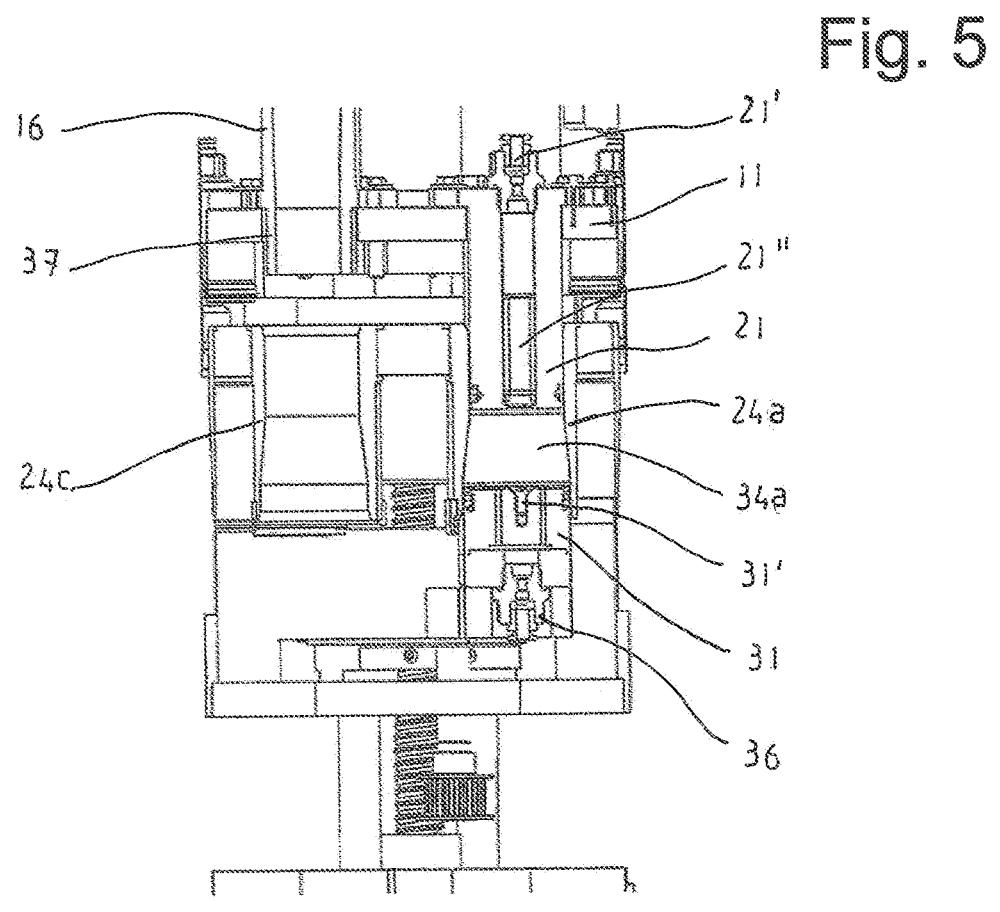

Shown in FIG. 3 to FIG. 5 are the positions of two brewing cylinders 24*a*, 24*b* of the apparatus 10, located next to one another. Once again, not all the details are shown. It is self-explanatory that these positions are in each case simultaneously present with the brewing cylinders 24, arranged offset by 180° on the other side of the carousel 20, and the same process is carried out, which is not shown in any greater detail.

FIG. 3 shows two of the brewing cylinders 24*a*, 24*b* next to one another, of which the brewing cylinder 24*a* on the left is shown at the loading of the beverage powder, and the other brewing cylinder 24*b* on the right is shown at the ejection of a cake. This position is reached by means of a movement of the pivot unit 30 upwards, wherein this piston 31 is inserted into the brewing cylinder 24*a*, and therefore the carousel 20 is moved together with the brewing cylinders 24 and raised upwards as far as the base plate 11, as a stop.

The extraction cell 34*a* of the brewing cylinder 24*a* is closed with a tight seal at the bottom by the piston 31, and at the top by the connection of the feed channel 16, and opens a connection sleeve 37 connected to it and penetrating the base plate 11, such that the beverage powder can be filled in portions into this extraction cell 34*a*, which is ground by the grinding device 12 or fed in a controlled manner from a container. This connecting sleeve 37 preferably projects with its under side into the brewing cylinder 24*a*, and therefore provides a tight connection and serves as an upper stop of the carousel 20. These positions for the loading of the beverage powder are predetermined by the fixed arrangements of the feed channels 16 on the base plate 11.

At the other brewing cylinder 24*b*, on the right, in this raised state of the carousel 20, the extraction piston 21 projects as far as into the lower region of the extraction cell 34*b* and causes the ejection of the beverage cake, which has formed by the preceding extraction of the powder in this brewing cylinder 24*b*, which is explained in greater detail hereinafter. For this purpose, a free space is present between the piston 31 and the shell 32 beneath the extraction cell 34*b*, which is open downwards, and an opening 44 is formed in the catchment shell 40, through which the cake can fall into the drawer referred to previously.

The piston 31 is in contact at the lower end of the respective brewing cylinder 24*a*, wherein the inner wall 24' of the brewing cylinder, which forms the extraction cell 34*a*, transfers from a cylindrical configuration 24" into the form of a truncated cone. This has the further advantage that the cake remaining in this conical region after the extraction becomes detached easily from the inner wall 24' when it is pressed downwards by the extraction piston 21.

According to FIG. 4, the pivot unit 30 and the carousel 20 held by it, with the brewing cylinders 24, are lowered after the loading of the respective extraction cell 34*a* by the rotating of the drive spindle 25 sufficiently far for the respective extraction piston 21 to be removed from the brewing cylinder 24*b*, and therefore the carousel 20, with the brewing cylinders 24, can be rotated to the right by the two pistons 31, remaining in it, of the pivot unit 30, by 60° into the next position according to FIG. 5, which is shown in just half of the path travelled.

FIG. 5 shows on the right the position at the extraction of the beverage powder, wherein the brewing cylinder 24*a* is rotated by 60° by the piston 31 located in it, and, as a consequence, is pushed into the extraction piston 21, projecting downwards at the base plate 11, wherein the pistons 31 and the bearing ring 33 are pivoted, and these can be raised upwards by the controlled pivot unit 30. It is advantageous if the respective piston is pushed upwards sufficiently far in the extraction cell 34*a* for the beverage powder to be somewhat compacted. The extraction cell 34*a* is located in the truncated cone-shaped region of the inner wall 24'. The brewing cylinder 24*c* is also shown pivoted into the loading position.

During the brewing process, cold, warm, or hot water from the valve-controlled water connection 36 is pressed, preferably under pressure, through at least one hole 31' in the piston 31, and through the powder, and therefore, in particular, is brewed. The beverage produced, in particular coffee, is then conveyed through at least one hole 21" in the extraction piston 21 to the valve-controlled connection 21', and from this to an outlet, not shown in greater detail. Conversely, during this extraction, the water could be conveyed from above instead of from beneath, through the extraction piston and through the powder and through the piston 31 to a beverage outlet.

After the extraction, the apparatus 10 is brought into the extended position, as can be seen in FIG. 2, in which the pistons 31 are each pressed downwards, out of the respective brewing cylinders 24*a*, and pivoted back to the brewing cylinder 24*c* ready for loading, and pushed into it. For this purpose, the carousel 20, held by the pivot unit 20, is detachably locked in a high position by a locking means, not shown in any greater detail, in which the pistons 31 are moved downwards and the extraction pistons 21 are moved upwards out of the brewing cylinders.

At the same time as the loading, the beverage cake in the brewing cylinders 24*a* is ejected, and, when the carousel 20 rotates again, during which the brewing cylinders 24*c* are moved into the extraction position, the brewing cylinders 24*a* located opposite are brought beneath the flushing cylinders 18, which are each provided with a water connection 18', and in the raised position of the pivot unit and of the carousel, which corresponds to that according to FIG. 3, a controlled flushing process is carried out in the brewing cylinder 24*a*. Following this, it is lowered, pivoted, and raised further to the other outlet channel 16, on the rear side, for loading.

The invention has been adequately described with the foregoing exemplary embodiments. It could, however, also have been explained by way of further variants. Instead of the pivot unit, the pistons could also be arranged such that they can be individually pivoted or adjusted. The modular unit 15 with the grinding device and the feed channels could also be configured differently.

In principle, the carousel could consist of four brewing cylinders, wherein the functions of the extracting, the ejection of the cake, and the flushing of the extraction cells would take place in one position. The apparatus is also well-suited, however, for the provision of more than six brewing cylinders, nine for example, wherein in each case three feed channels, three pistons, three flushing pistons, and three outlets would be present.

The carousel with the plurality of brewing cylinders and the pivot unit respectively, could be arranged in a fixed position, and the feed channels and the extraction pistons could be height-adjustable together or separately from one another.

The vertical drive spindle 25 is configured as a threaded rod. It could, however, also be configured as a toothed wheel rod with a pinion drive in the pivot unit, electromechanical or similar. Likewise, the slide guide 27 could be configured in a different manner than guide rods arranged next to one another, such as a guide tube or the like. The drive element 22 could, as an electric motor, also be coupled directly to the drive spindle.

The drive element could also be configured in such a way that it would simultaneously exert an upwards and downwards movement of the pivot unit and also a pivoting of the pistons 31.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. An apparatus for producing a beverage comprising:

a plurality of brewing cylinders in the form of a carousel, wherein the plurality of brewing cylinders are configured to be pivoted about an axis of rotation, wherein each brewing cylinder of the plurality of brewing cylinders has an extraction cell;

at least two pistons positioned beneath the plurality of brewing cylinders, wherein the at least two pistons are configured to be pivoted about the axis of rotation;

at least two feed channels positioned above the brewing cylinders and configured to load beverage powder into the brewing cylinders; and at least two extraction pistons positioned at a distance from the at least two feed channels, wherein, in a specific position of the plurality of brewing cylinders, the at least two feed channels are each positioned above respective brewing cylinders of the plurality of brewing cylinders, each piston of the at least two pistons is configured to be inserted into and moved out of the respective brewing cylinders of the plurality of brewing cylinders, and each extraction piston of the at least two extraction pistons are configured to be inserted into and moved out of brewing cylinders adjacent to the respective brewing cylinders.

2. The apparatus according to claim 1, wherein after the at least two pistons have each moved out of the respective brewing cylinders, the at least two pistons are configured to be pivoted away from the respective brewing cylinders, and each of the at least two pistons are configured to be moved upwards into respective empty brewing cylinders of the plurality of brewing cylinders adjacent the respective brewing cylinders and wherein the at least two extraction pistons are configured to expel cakes of beverage powder in the respective brewing cylinders downwards.

3. The apparatus according to claim 1, wherein, in the specific position of the plurality of brewing cylinders, each of the at least two pistons are configured to be inserted into respective brewing cylinders of the plurality of brewing cylinders, and each of the at least two pistons are configured to be lowered and pivoted with the plurality of brewing cylinders while positioned in the respective brewing cylinders, and after pivoting, the respective brewing cylinders are configured to be raised, until the respective brewing cylinders are inserted into the at least two extraction pistons.

4. The apparatus according to claim 1, wherein at least two flushing pistons for cleaning of respective extraction cells of the respective brewing cylinders are arranged such that the at least two flushing pistons are inserted into and removed from respective empty brewing cylinders of the plurality of brewing cylinders adjacent the respective brewing cylinders.

5. The apparatus according to claim 4, wherein the at least two feed channels, the at least two extraction pistons, and the at least two flushing pistons are arranged alternatingly about the axis of rotation in a modular unit such that the at least two feed channels, the at least two extraction pistons, and the at least two flushing pistons interact with the plurality of brewing cylinders.

6. The apparatus according to claim 5, further comprising at least one grinding device installed in the modular unit, the grinding device comprising a drive and at least one connecting piece for delivering the beverage powder into the feed channels from the drive.

7. The apparatus according to claim 5, wherein a rotary drive unit for a vertical drive spindle is mounted in the modular unit.

8. The apparatus according to claim 4, wherein is a modular unit with the at least two feed channels, the at least two extraction pistons, and the at least two flushing pistons are positioned in a first plane, the plurality of brewing cylinders are positioned in a second plane, the at least two pistons are positioned in a third plane, and a catchment shell is position in a fourth plane.

9. The apparatus according to claim 8, further comprising a vertical drive spindle and a slide guide, wherein the modular unit and the catchment shell are stationary, and the vertical drive spindle and the slide guide extend between the modular unit and the catchment shell and are held by the modular unit and the catchment shell.

10. The apparatus according to claim 9, wherein the plurality of brewing cylinders and the at least two pistons are configured to be moved vertically.

11. The apparatus according to claim 9, wherein the carousel including the plurality of brewing cylinders is positioned in the second plane and a pivot unit including the at least two pistons is arranged in the third plane.

12. The apparatus according to claim 1, wherein the plurality of brewing cylinders are positioned axis-parallel to one another and held in the carousel in a circular pattern about the axis of rotation, and wherein the plurality of brewing cylinders are configured to be moved by a vertical slide guide towards and away from the feed channels and the extraction pistons.

13. The apparatus according to claim 12, wherein the plurality of brewing cylinders includes six brewing cylinders which are held in the carousel offset 60° from each other, wherein when the plurality of brewing cylinders are in the specific positions, the two feed channels and the two extraction pistons each interact with the respective brewing cylinders, wherein the respective brewing cylinders are offset by 180° from each other.

14. The apparatus according to claim 1, further comprising a pivot unit positioned beneath the plurality of brewing cylinders, wherein the pivot unit includes the at least two pistons, wherein the pivot unit is moved up and down by a slide guide, wherein the pivot unit is height adjustable by a first drive unit, and the at least two pistons are held by a second drive unit configured to pivot the at least two pistons on the pivot unit.

15. The apparatus according to claim 14, wherein the first drive unit comprises a vertical drive spindle rotationally connected to the pivot unit.

16. The apparatus according to claim 15, wherein the vertical drive spindle and the slide guide extend from a lower catchment shell through the pivot unit and the carousel to a rotary drive unit of an upper unit.

17. The apparatus according to claim 14, wherein the carousel and the plurality of brewing cylinders are lowered, pivoted, and raised by the pivot unit or the at least two pistons.

18. The apparatus according to claim 14, wherein the carousel is detachably locked in a high position by a lock, wherein, with the pivot unit in a lowered position, the at least two pistons are moved downwards and the at least two extraction pistons are moved upwards out of the respective brewing cylinders.

19. The apparatus according to claim 1, each of the at least two pistons comprises a water connection for providing water for extracting the beverage from the beverage powder loaded in the respective brewing cylinders, and each of the at least two extraction pistons comprises a connection discharging the beverage out of the extraction cells of the respective brewing cylinders.

20. An apparatus for producing a beverage comprising:

a plurality of brewing cylinders, wherein the plurality of brewing cylinders are configured to be pivoted about an axis of rotation, wherein each brewing cylinder of the plurality of brewing cylinders has an extraction cell;

at least two pistons positioned beneath the plurality of brewing cylinders, wherein the at least two pistons are configured to be pivoted about the axis of rotation, and in a specific position of the plurality of brewing cylinders, each piston of the at least two pistons is configured to be inserted into and moved out of respective brewing cylinders of the plurality of brewing cylinders.

* * * * *